United States Patent
Kolmanovsky et al.

(10) Patent No.: US 6,568,173 B1
(45) Date of Patent: May 27, 2003

(54) CONTROL METHOD FOR TURBOCHARGED DIESEL ENGINE AFTERTREATMENT SYSTEM

(75) Inventors: Ilya Vladimir Kolmanovsky, Ypsilanti, MI (US); Anna G. Stefanopoulou, Golleta, CA (US)

(73) Assignee: Ford Global Technologies, Inc., Dearborn, MI (US)

( * ) Notice: Subject to any disclaimer, the term of this patent is extended or adjusted under 35 U.S.C. 154(b) by 325 days.

(21) Appl. No.: 09/631,131

(22) Filed: Aug. 2, 2000

(51) Int. Cl.[7] .................................................. F01N 5/04
(52) U.S. Cl. ............................ 60/280; 60/278; 60/274; 60/605.2
(58) Field of Search ....................... 60/278, 280, 39.05, 60/39.27, 605.2, 608

(56) References Cited

U.S. PATENT DOCUMENTS

| | | | |
|---|---|---|---|
| 4,235,076 A | * 11/1980 | Meloche et al. | 60/280 |
| 4,615,172 A | 10/1986 | Mayer | |
| 4,694,653 A | * 9/1987 | Kawamura | 60/597 |
| 4,745,754 A | * 5/1988 | Kawamura | 60/608 |
| 4,769,993 A | * 9/1988 | Kawamura | 60/608 |
| 4,835,963 A | 6/1989 | Hardy | |
| 4,884,406 A | * 12/1989 | Kawamura | 60/608 |
| 5,036,668 A | 8/1991 | Hardy | |
| 5,081,836 A | 1/1992 | Smith et al. | |
| 5,142,864 A | 9/1992 | Dunne | |
| 5,560,208 A | * 10/1996 | Halimi et al. | 60/608 |
| 5,771,868 A | * 6/1998 | Khair | 60/605.2 |
| 5,778,674 A | 7/1998 | Kimura | |
| 5,836,152 A | 11/1998 | Schatz | |
| 5,906,098 A | * 5/1999 | Woollenweber et al. | 60/608 |
| 6,041,602 A | * 3/2000 | Dickey | 60/605.2 |
| 6,062,026 A | * 5/2000 | Woollenweber et al. | 60/605.2 |
| 6,064,122 A | * 5/2000 | McConnell | 60/608 |
| 6,209,316 B1 | * 4/2001 | Duvinage et al. | 60/274 |

* cited by examiner

Primary Examiner—Thomas Denion
Assistant Examiner—Diem Tran
(74) Attorney, Agent, or Firm—Carlos Hanze

(57) ABSTRACT

A method of controlling an exhaust gas aftertreatment system in a compression ignition engine having a power-assisted turbocharger coupled to a power source. The turbocharger includes a compressor in communication with an intake manifold and a turbine in communication with an exhaust manifold. The method comprises the steps of determining an operating mode of the exhaust gas aftertreatment system selected from the group consisting of a light off mode, regeneration mode, and storage mode. The method then determines a charge value associated with the power source, and engages the power source to the power-assisted turbocharger as a function of the charge value and the operating mode of the exhaust gas aftertreatment system. In one aspect of the invention, negative power is applied to the power-assisted turbocharger to increase the exhaust gas temperature to achieve particulate filter light-off. In another aspect, positive power is applied to the power-assisted turbocharger to reduce turbo-lag or engine pumping losses. In another aspect, negative or positive power is applied to the power-assisted turbocharger to maintain a desired oxygen flow through the particulate filter.

20 Claims, 2 Drawing Sheets

CONTROL METHOD FOR TURBOCHARGED DIESEL ENGINE AFTERTREATMENT SYSTEM

TECHNICAL FIELD

This invention relates to turbocharged compression ignition engines having exhaust gas aftertreatment systems and, more particularly, to methods of controlling the turbocharger to regulate the exhaust gas oxygen content and temperature.

BACKGROUND OF THE INVENTION

High performance, high speed diesel engines are often equipped with turbochargers to increase power density over a wider engine operating range, and EGR systems to reduce the production of NOx emissions.

Turbochargers use a portion of the exhaust gas energy to increase the mass of the air charge delivered to the engine combustion chambers. The larger mass of air can be burned with a larger quantity of fuel, thereby resulting in increased power and torque as compared to naturally aspirated engines.

A typical turbocharger consists of a compressor and turbine coupled by a common shaft. The exhaust gas drives the turbine which drives the compressor which, in turn, compresses ambient air and directs it into the intake manifold. Turbocharger power assist systems (TPAS) allow the intake airflow to be optimized over a range of engine speeds by electronically driving the compressor. Such systems have typically been used to improve engine performance. During engine acceleration from low engine speed and load conditions, the TPAS can be used to add a positive torque on the turbocharger shaft thereby improving turbocharger acceleration. Faster response of the turbocharger results in faster increase of the fresh air charge delivery to the engine. Since the amount of fuel that can be burnt in a diesel engine without generating visible smoke is limited by the amount of fresh air charge, faster rise in the air charge delivery results in the improved diesel engine acceleration performance. In particular, an important transient performance characteristic of turbocharged engines, the so called turbo-lag, can be reduced. At higher engine speed and load conditions, the TPAS can be used to absorb and store (e.g., in a battery) some of the excess energy provided by the exhaust gas to the turbocharger, essentially, emulating a wastegate and preventing engine overboost. This energy is normally be wasted as a portion of the exhaust gas bypasses the turbocharger when the wastegate opens.

The inventors herein have discovered that the effect of applying a positive power to the turbocharger shaft results in a decrease in the post-turbine exhaust gas temperature and increase the post-turbine exhaust gas air/fuel ratio. Conversely, the application of negative power to the compressor results in increased temperature of the post-turbine exhaust gas and decrease in the exhaust gas oxygen concentration. Both the temperature of the exhaust gas and the oxygen concentration in the exhaust gas are important variables in diesel engine aftertreatment control.

DISCLOSURE OF THE INVENTION

One object of the present invention is to provide an improved compression ignition engine control strategy.

Another object is to provide improved diesel aftertreatment control.

According to the present invention, the foregoing and other objects and advantages are obtained by According to the present invention, the foregoing and other objects and advantages are attained by a method of controlling an exhaust gas aftertreatment system in a compression ignition engine having a power-assisted turbocharger coupled to a power source. The turbocharger includes a compressor in communication with an intake manifold and a turbine in communication with an exhaust manifold. The method comprises the steps of determining an operating mode of the exhaust gas aftertreatment system selected from the group consisting of a light off mode, regeneration mode, and storage mode. The method then determines a charge value associated with the power source, and engages the power source to the power-assisted turbocharger as a function of the charge value and the operating mode of the exhaust gas aftertreatment system.

In one aspect of the invention, negative power is applied to the power-assisted turbocharger to increase the exhaust gas temperature to achieve particulate filter light-off. In another aspect, positive power is applied to the power-assisted turbocharger to reduce turbo-lag or engine pumping losses. In another aspect, negative or positive power is applied to the power-assisted turbocharger to maintain a desired oxygen flow through the particulate filter.

Other objects and advantages of the invention will become apparent upon reading the following detailed description and appended claims, and upon reference to the accompanying drawings.

BRIEF DESCRIPTION OF THE DRAWINGS

For a more complete understanding of the invention, reference should be made to the embodiments illustrated in greater detail in the accompanying drawings and described below by way of examples of the invention. In the drawings.

DESCRIPTION OF THE PREFERRED EMBODIMENT

Figure 1:
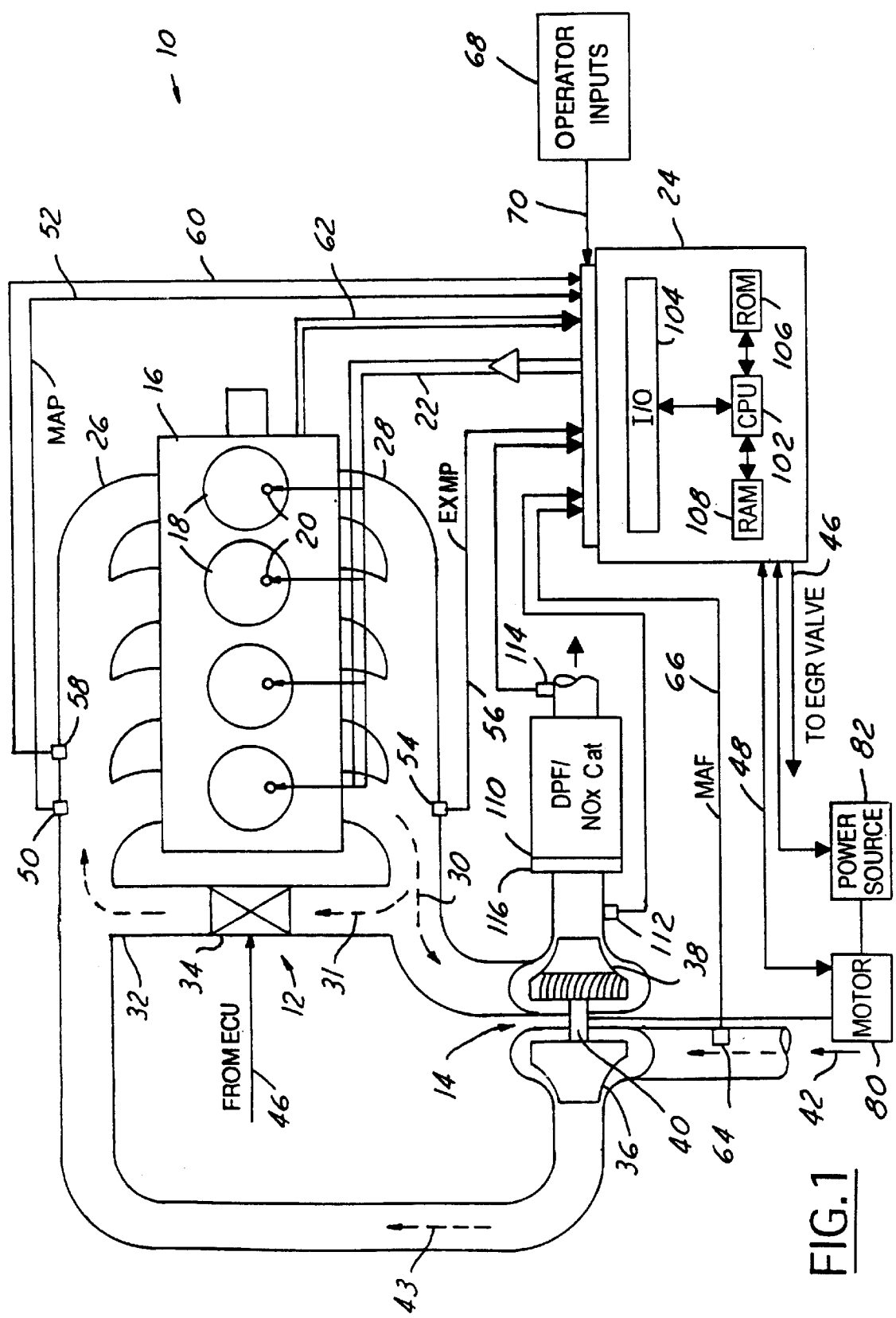
FIG. 1 is a schematic view of a compression ignition engine system having a TPAS in accordance with one embodiment of the present invention.

Turning first to FIG. 1, there is shown a simplified schematic diagram of a compression ignition engine system 10 equipped with an exhaust gas recirculation (EGR) system 12 and a turbocharger power assist system (TPAS) 14. A representative engine block 16 is shown having four combustion chambers 18. Each of the combustion chambers 18 includes a direct-injection fuel injector 20. The duty cycle of the fuel injectors 20 is determined by the engine control unit (ECU) 24 and transmitted along signal line 22. Air enters the combustion chambers 18 through the intake manifold 26, and combustion gases are exhausted through the exhaust manifold 28 in the direction of arrow 30.

To reduce the level of $NO_x$ emissions, the engine is equipped with an EGR system 12. The EGR system 12 comprises a conduit 32 connecting the exhaust manifold 28 to the intake manifold 26. This allows a portion of the exhaust gases to be circulated from the exhaust manifold 28 to the intake manifold 26 in the direction of arrow 31. An EGR valve 34 regulates the amount of exhaust gas recirculated from the exhaust manifold 28. In the combustion chambers, the recirculated exhaust gas acts as an inert gas, thus lowering the flame and in-cylinder gas temperature and decreasing the formation of $NO_x$. On the other hand, the recirculated exhaust gas displaces fresh air and reduces the air-to-fuel ratio of the in-cylinder mixture.

The TPAS 14 uses exhaust gas energy to increase the mass of the air charge delivered to the engine combustion chambers 18. The exhaust gas flowing in the direction of arrow 30 drives the TPAS 14. This larger mass of air can be burned with a larger quantity of fuel, resulting in more torque and power as compared to naturally aspirated, non-turbocharged engines.

The TPAS 14 also consists of a compressor 36 and a turbine 38 coupled by a common shaft 40. The exhaust gas 30 drives the turbine 38 which drives the compressor 36 which, in turn, compresses ambient air 42 and directs it (arrow 43) into the intake manifold 26. In addition, a motor 80 driven by a power source 82 such as batteries can be used to add torque to the driveshaft 40 of the compressor 36.

All of the engine systems, including the EGR 12, TPAS 14 and fuel injectors 20 are controlled by the ECU. For example, signal 46 from the ECU 24 regulates the EGR valve position, and signal 48 regulates the drive 40 of the TPAS.

In the ECU 24, the command signals 46, 48 to the EGR 12 and TPAS drive motor 80 are calculated from measured variables and engine operating parameters by means of a control algorithm. Sensors and calibratable lookup tables residing in ECU memory provide the ECU 24 with engine operating information. For example, an intake manifold pressure (MAP) sensor 50 provides a signal ($P_m$) 52 to the ECU indicative of the pressure in the intake manifold 26. Likewise, exhaust manifold pressure (EXMP) sensor 54 provides a signal ($P_{exh}$) 56 to the ECU 24 indicative of the pressure in the exhaust manifold 28. Further, an intake manifold temperature sensor 58 provides a signal ($T_m$) 60 to the ECU 24 indicative of the intake manifold temperature. A mass airflow (MAF) sensor 64 also provides a signal ($m_{comp}$) 66 indicative of the compressor mass airflow to the ECU 24.

Additional sensory inputs can also be received by the ECU along signal line 62 such as engine coolant temperature, engine speed, and throttle position. Additional operator inputs 68 are received along signal 70 such as the accelerator pedal position or other fueling request input.

ECU 24 as shown in FIG. 1 is a conventional microcomputer including a microprocessor unit 102, input/output ports 104, read-only memory 106, random access memory 108, and a conventional data bus. These functional descriptions of the various types of volatile and non-volatile storage may be implemented by a number of known physical devices including, but not limited to, EPROMs, EEPROMs, PROMs, flash memory and the like.

The engine system further includes an exhaust gas aftertreatment system 110 which preferably includes a diesel particulate filter (DPF) and/or a lean $NO_x$ catalyst (LNC). The aftertreatment system may also include a heater and/or cooler 116. Upstream and downstream temperature sensors 112, 114 are also included to monitor the temperature of the DPF/LNC 110.

Both temperature of the exhaust gas and the oxygen concentration in the exhaust gas are important variables for the diesel engine aftertreatment control. Specifically, the diesel particulate filter (DPF) temperature has to be raised above a threshold value to initiate DPF light-off. For conventional turbocharged diesel engines light-off at light and medium loads present a challenge due to low exhaust gas temperatures. To raise the temperature, the present method engages the TPAS in a negative power mode (i.e., "braking" the turbine) to increase the exhaust gas temperature. The energy absorbed from the turbocharger shaft is then stored in the battery 82 for later use that may include operating an electric aftertreatment heater cooler 116. Such an electric heater 116 can provide further temperature increase required for DPF light-off or for LNC temperature control as described below.

Once DPF is lit-off, the oxygen flow to DPF must be carefully controlled. In particular, oxygen flow may have to be reduced to prevent thermal damage of DPF. The concentration of the oxygen can be reduced by operating TPAS in negative power mode.

Similarly, the lean $NO_x$ catalyst (LNC) operates efficiently only in a narrow temperature window. In addition, a sufficiently high ratio of HC to $NO_x$ has to be supported. The TPAS is used in the present method to regulate the LNC temperature and, to some extent, to regulate the HC to $NO_x$ ratio as it affects the engine air/fuel ratio.

The engine control methods described herein regulate the TPAS power either applied to turbocharger shaft 40 or absorbed from the turbocharger shaft 40 to a calibratable value that is optimized for DPF regeneration and/or LNC efficiency. Conventional approaches for diesel engine postturbine temperature or oxygen concentration control include the use of a throttle or reductant injection. The TPAS can be used in conjunction with these conventional means of aftertreatment control to increase the control authority over the temperature range or the oxygen concentration range.

Figure 2:
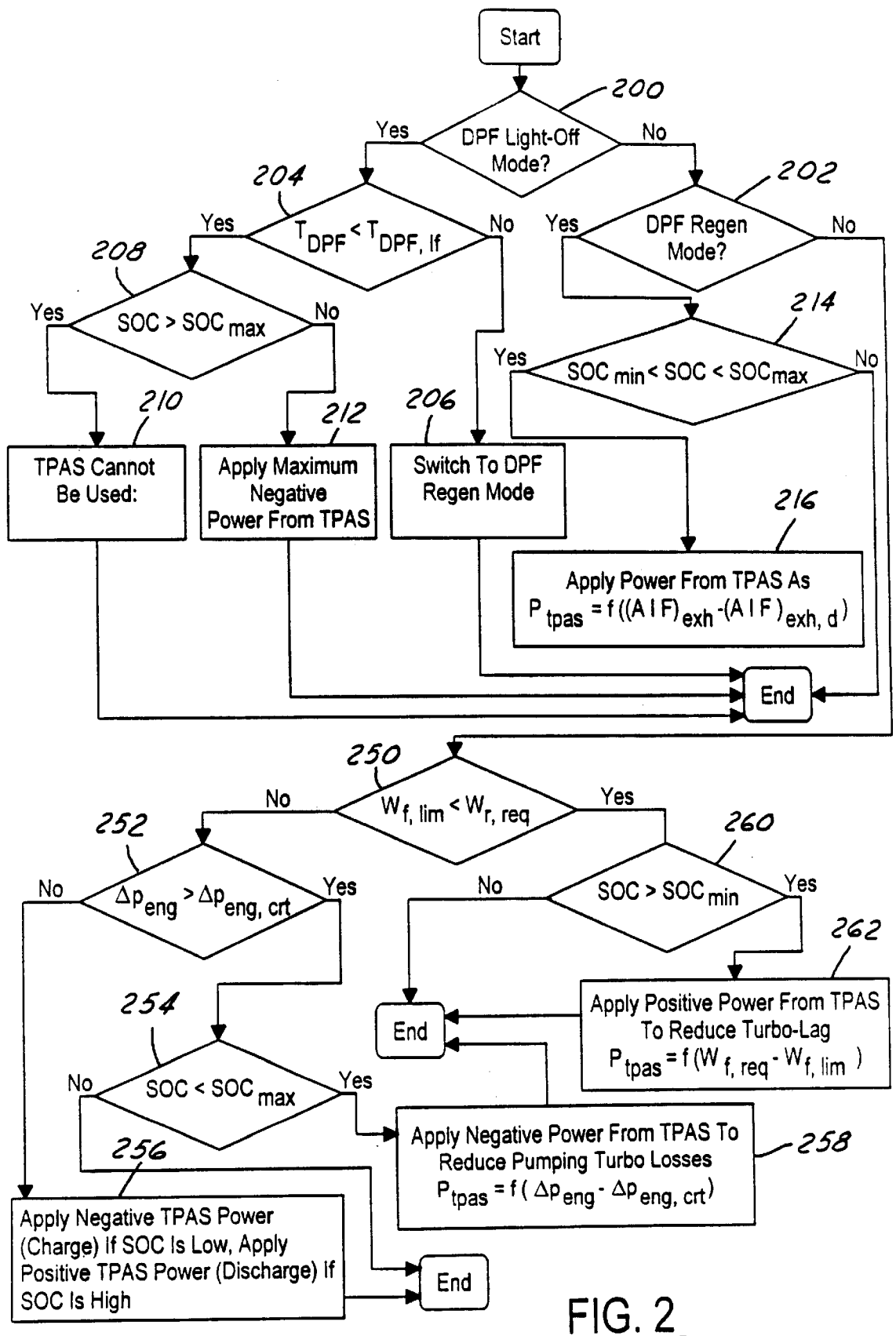
FIG. 2 is a logic diagram of an engine control method in accordance with one embodiment of the present invention.

FIG. 2 is a logic flow diagram showing one embodiment of a method for controlling the TPAS for DPF light-off and regeneration. For DPF light-off, it is necessary to increase the measured or estimated DPF temperature above a predetermined threshold. This is achieved by engaging the TPAS in the braking or negative power mode. Once the DPF is lit-off, the oxygen flow through the aftertreatment system is carefully monitored and controlled by using the TPAS in both the braking mode or positive power mode as necessary. The logic flow diagram of FIG. 2 also describes the TPAS operation during DPF storage mode. In this region, the TPAS is used to reduce the turbo-lag or the engine pumping losses. However, it is necessary to monitor the state of charge of the battery or storage system because, if the charge is too low, the TPAS may not be able to engage in the positive power mode. Conversely, if the battery charge is too high, the TPAS may not be able to engage in the braking or negative power mode.

Throughout the description of FIG. 2, the following variable definitions are used:

| | |
|---|---|
| SOC | represents the state of charge of the battery, wherein the subscripts "min" and "max" are, respectively, the minimum and maximum allowed values of SOC. |
| $T_{DPF}$ | represents the estimated or measured DPF temperature, and $T_{DPF,lf}$ is the temperature at which DPF lights-off. |
| $W_{f,req}$ | is the demanded fueling rate represented by driver input through pedal depression. |
| $W_{f,lim}$ | is the minimum allowed air/fuel ratio fueling rate to prevent smoke limiting. |
| $3P_{eng}$ | is the estimated or measured pressure drop across the engine, represented by the exhaust pressure minus intake pressure. |
| $3P_{eng,crt}$ | is the critical pressure drop above which TPAS is engaged in the braking mode to reduce pumping losses. This can be a function of speed and load. |
| $(A/F)_{exh}$ | is the exhaust air/fuel ratio, $(A/F)_{exh,d}$ is the desired exhaust air/fuel ratio. |

| | |
|---|---|
| $P_{tpas}$ | is the power applied or absorbed (if negative) by the TPAS. | f represents a (calibratable) function. This function may be as simple as a gain multiplying the argument, or a more complex function. DPF light-off mode is the mode in which engine management system is attempting to light-off the DPF. The light-off mode is followed by the DPF regeneration mode, wherein the particulates stores in the DPF are burned off.

In step 200, the control method determines whether DPF light-off mode is active. If not, the logic continues to step 202 where it determines whether the DPF regeneration mode is active. If neither of these conditions are met, the logic continues to step 250 and higher wherein the TPAS operation during DPF storage operation is described.

If the control system is operating in DPF light-off mode, it is determined in step 204 whether the light-off temperature for the DPF has been reached. If the DPF light-off temperature has been attained, the logic sets the DPF regeneration mode flag in step 206 and ends. Otherwise, the logic continues to step 208 and compares the state of charges of battery to its maximum value. If the maximum value has been reached, the TPAS cannot be used (step 210) and some other means of raising the DPF temperature must be employed such as reductant injection or throttling. If, however, the maximum charge limit has not been reached, the maximum negative power from the TPAS is applied in step 212.

In the DPF regeneration mode, the state of charges of battery is again determined at step 214. If the state of charge is within the window defined by the minimum and maximum charge, the logic continues to step 216 wherein power is applied from the TPAS as a function of exhaust gas air/fuel ratio and the desired exhaust gas air/fuel ratio. In this way, the TPAS regulates oxygen flow to prevent damage to the DPF yet sustain the DPF regeneration by adding oxygen at high engine loads to maintain particulate burn-off and reducing oxygen flow at lighter engine loads to prevent DPF damage.

Steps 250–262 describe the aftertreatment control method during normal engine operation wherein the DPF is in a storage mode, i.e., the DPF is not in light-off mode or regeneration mode. In this operating mode, the TPAS is used to reduce the turbolag or engine pumping losses. Accordingly, in step 250, the air/fuel ratio fueling rate limit is compared to the demanded fueling rate. The fueling rate limit is related to turbo-lag in that fuel limiting is commonly performed to prevent undesirable visible smoke emissions. If the fueling rate limit has not been exceeded, the logic continues to step 252 wherein the pressure drop across the engine is compared to a critical value. A large pressure drop corresponds to large pumping losses. Thus, if the pressure drop is above the critical pressure drop value, the TPAS is applied in either a positive or negative mode. If the critical pressure drop value is exceeded, however, the logic determines the battery state of charge in step 254. If the maximum value has not been exceeded, the logic continues to step 258 wherein the TPAS is operating to produce negative power to reduce pumping losses. The amount of negative power applied is a function of the pressure drop across the engine and the critical pressure drop value.

Referring again to step 250, if the requested fueling rate exceeds the fueling rate limit, the battery state of charge is determined in step 260. If the SOC is greater than the minimum SOC value, the TPAS is engaged in the positive power mode in step 262 to reduce the turbo-lag. This is done as a function of the requested fueling rate and the fueling rate limit.

From the foregoing, it can be seen that there has been brought to the art a new and improved diesel engine aftertreatment control method. While the invention has been described in connection with one or more embodiments, it should be understood that the invention is not limited to those embodiments. For instance, the TPAS can be employed in a similar manner to maintain a lean $NO_x$ trap catalyst (LNC) within its optimum efficiency temperature range. Accordingly, the invention covers all alternatives, modifications, and equivalents, as may be included within the spirit and scope of the appended claims.

What is claimed is:

1. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an exhaust gas temperature value;

determining a charge value associated with said power source; and engaging said power source to said power-assisted turbocharger as a function of said charge value to drive said exhaust gas temperature value toward a desired exhaust gas temperature value.

2. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an exhaust gas temperature value;

determining a charge value associated with said power source including comparing said charge value to a maximum charge value and a minimum charge value; and engaging said power source to said power-assisted turbocharger as a function of said charge value to drive said exhaust gas temperature value toward a desired exhaust gas temperature value.

3. The method of claim 2 wherein the step of engaging said power source includes the step of applying a negative power to said power-assisted turbocharger when said exhaust gas temperature value is less than said desired exhaust gas temperature value and said charge value is less than said maximum charge value.

4. The method of claim 2 further comprising the step of engaging said power source to said power-assisted turbocharger as a function of an exhaust gas air/fuel ratio and a desired exhaust gas air/fuel ratio when said exhaust gas temperature value is greater than said desired exhaust gas temperature value and said charge value is greater than said minimum charge value and less than said maximum charge value.

5. The method of claim 2 further comprising the steps of comparing a fueling rate value to a fueling limit value and, when said fueling rate value is greater than said fueling limit value and said charge value is greater than said minimum charge value, applying a positive power to said power-assisted turbocharger as a function of said fueling rate value and said fueling rate limit value.

6. The method of claim 5 further comprising the steps of determining a pressure drop value from said exhaust manifold to said intake manifold and when said pressure drop value is greater than a critical pressure drop value and said charge value is less than said maximum charge value, applying a negative power to said power-assisted turbocharger as a function of said pressure drop value and said critical pressure drop value.

7. The method of claim 6 further comprising the step of applying power to said power-assisted turbocharger as a function of said charge value when said power drop value is greater than said critical pressure drop value.

8. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an operating mode of said exhaust gas aftertreatment system selected from the group consisting of a light off mode, regeneration mode, and storage mode;

determining a charge value associated with said power source; and engaging said power source to said power-assisted turbocharger as a function of said charge value and said operating mode of said exhaust gas aftertreatment system.

9. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an operating mode of said exhaust gas aftertreatment system selected from the group consisting of a light off mode, regeneration mode, and storage mode;

determining a charge value associated with said power source; and determining an exhaust gas temperature value; and comparing said charge value to a maximum charge value and when said exhaust gas temperature value is less than a desired exhaust gas temperature value and said charge value is less than said maximum charge value, applying a maximum negative power to said power-assisted turbocharger.

10. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an operating mode of said exhaust gas aftertreatment system selected from the group consisting of a light off mode, regeneration mode, and storage mode;

determining a charge value associated with said power source; and when said exhaust gas aftertreatment system is in said regeneration mode, comparing said charge value to a maximum and minimum charge value and engaging said power source to said power-assisted turbocharger as a function of an exhaust gas air/fuel ratio and a desired exhaust gas air/fuel ratio when said charge value is between said minimum and maximum charge values.

11. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an operating mode of said exhaust gas aftertreatment system selected from the group consisting of a light off mode, regeneration mode, and storage mode;

determining a charge value associated with said power source; and when said exhaust gas aftertreatment system is in said storage mode, comparing a fueling rate value to a fueling limit value and comparing said charge value to a minimum charge value and, when said fueling rate value is greater than said fueling limit value and said charge value is greater than said minimum charge value, applying a positive power to said power-assisted turbocharger as a function of said fueling rate value and said fueling rate limit value.

12. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an operating mode of said exhaust gas aftertreatment system selected from the group consisting of a light off mode, regeneration mode, and storage mode;

determining a charge value associated with said power source; and when said exhaust gas aftertreatment system is in said storage mode, comparing a fueling rate value to a fueling limit value, comparing said charge value to a maximum charge value, and determining a pressure drop value from said exhaust manifold to said intake manifold, and when said fueling rate value is less than said fueling limit value and said pressure drop value is greater than a critical pressure drop value and said charge value is less than said maximum charge value, applying a negative power to said power-assisted turbocharger as a function of said pressure drop value and said critical pressure drop value.

13. A method of controlling an exhaust gas aftertreatment system in a compression ignition engine having a power-assisted turbocharger coupled to a power source, said turbocharger including a compressor in communication with an intake manifold and a turbine in communication with an exhaust manifold, the method comprising the steps of:

determining an operating mode of said exhaust gas aftertreatment system selected from the group consisting of a light off mode, regeneration mode, and storage mode;

determining a charge value associated with said power source; and when said exhaust gas aftertreatment system is in said storage mode, comparing a fueling rate value to a fueling limit value and determining a pressure drop value from said exhaust manifold to said intake manifold, and when said fueling rate value is less than said fueling limit value and said pressure drop value is less than a critical pressure drop value, applying power to said power-assisted turbocharger as a function of said charge value.

14. A compression ignition engine system comprising;

an exhaust gas aftertreatment system including a particulate filter;

a power-assisted turbocharger coupled to a power source, said turbocharger including a compressor in communication with an intake manifold and a turbine in communication with an exhaust manifold; and a controller including a microprocessor programmed to perform the following steps:

determine an operating mode of said exhaust gas aftertreatment system selected from the group consisting of a light off mode, regeneration mode, and storage mode;

determine a charge value associated with said power source; and engage said power source to said power-assisted turbocharger as a function of said charge value and said operating mode of said exhaust gas aftertreatment system.

15. A compression ignition engine system comprising:

an exhaust gas aftertreatment system including a particulate filter and a lean $NO_x$ trap;

a power-assisted turbocharger coupled to a power source, said turbocharger including a compressor in communication with an intake manifold and a turbine in communication with an exhaust manifold; and a controller including a microprocessor programmed to perform the following steps:

determine an operating mode of said exhaust gas aftertreatment system selected from the group consisting of a light off mode, regeneration mode, and storage mode;

determine a charge value associated with said power source, and engage said power source to said power-assisted turbocharger as a function of said charge value and said operating mode of said exhaust gas aftertreatment system.

16. The compression ignition engine system of claim 15 wherein said exhaust gas aftertreatment system includes a heater.

17. A compression ignition engine system comprising:

an exhaust gas aftertreatment system including a particulate filter;

an exhaust gas temperature sensor;

a power-assisted turbocharger coupled to a power source, said turbocharger including a compressor in communication with an intake manifold and a turbine in communication with an exhaust manifold; and a controller including a microprocessor programmed to perform the following steps:

determine an operating mode of said exhaust gas aftertreatment system selected from the group consisting of a light off mode, regeneration mode, and storage mode;

determine a charge value associated with said power source;

engage said power source to said power-assisted turbocharger as a function of said charge value and said operating mode of said exhaust gas aftertreatment system; and determine an exhaust gas temperature value;

compare said charge value to a maximum charge value; and when said exhaust gas temperature value is less than a desired exhaust gas temperature value and said charge value is less than said maximum charge value, apply a maximum negative power to said power-assisted turbocharger.

18. The compression ignition system of claim 17 further comprising an exhaust gas air/fuel ratio sensor and wherein said microprocessor is further programmed to perform the following steps:

compare said charge value to a maximum and minimum charge value; and engage said power source to said power-assisted turbocharger as a function of an exhaust gas air/fuel ratio and a desired exhaust gas air/fuel ratio when said charge value is between said minimum and maximum charge values.

19. The compression ignition system of claim 17 wherein said microprocessor is further programmed to perform the following steps:

compare a fueling rate value to a fueling limit value and compare said charge value to a minimum charge value and, when said fueling rate value is greater than said fueling limit value and said charge value is greater than said minimum charge value, apply a positive power to said power-assisted turbocharger as a function of said fueling rate value and said fueling rate limit value.

20. The compression ignition system of claim 17 further comprising an intake manifold pressure sensor for providing an intake manifold pressure value, an exhaust manifold pressure sensor for providing an exhaust manifold pressure value, and wherein said microprocessor is further programmed to perform the following steps:

compare a fueling rate value to a fueling limit value and determine a pressure drop value from a difference between said exhaust manifold pressure value and said intake manifold pressure value, and when said fueling rate value is less than said fueling limit value and said pressure drop value is less than a critical pressure drop value, apply power to said power-assisted turbocharger as a function of said charge value.

* * * * *